United States Patent
Tarbotton et al.

(10) Patent No.: US 7,917,951 B1
(45) Date of Patent: *Mar. 29, 2011

(54) DETECTING MALWARE CARRIED BY AN E-MAIL MESSAGE

(75) Inventors: Lee Codel Lawson Tarbotton, Leicester (GB); Kevin Andrew Gudgion, Bucks (GB)

(73) Assignee: McAfee, Inc., Santa Clara, CA (US)

( * ) Notice: Subject to any disclaimer, the term of this patent is extended or adjusted under 35 U.S.C. 154(b) by 899 days.

This patent is subject to a terminal disclaimer.

(21) Appl. No.: 11/750,707

(22) Filed: May 18, 2007

Related U.S. Application Data

(63) Continuation of application No. 10/142,167, filed on May 10, 2002, now Pat. No. 7,237,008.

(51) Int. Cl.
    *G06F 9/00* (2006.01)
(52) U.S. Cl. .............................. 726/22; 726/11; 713/188
(58) Field of Classification Search .................. 713/188; 726/11, 13, 22–25
    See application file for complete search history.

(56) References Cited

U.S. PATENT DOCUMENTS

| | | | | |
|---|---|---|---|---|
| 5,832,208 A | * | 11/1998 | Chen et al. | 726/24 |
| 6,123,737 A | * | 9/2000 | Sadowsky | 717/173 |
| 6,393,465 B2 | * | 5/2002 | Leeds | 709/207 |
| 6,401,210 B1 | * | 6/2002 | Templeton | 726/24 |
| 6,654,787 B1 | * | 11/2003 | Aronson et al. | 709/206 |
| 2002/0095454 A1 | * | 7/2002 | Reed et al. | 709/201 |
| 2002/0116641 A1 | * | 8/2002 | Mastrianni | 713/201 |

* cited by examiner

*Primary Examiner* — Kimyen Vu
*Assistant Examiner* — Darren B Schwartz
(74) *Attorney, Agent, or Firm* — Zilka Kotab, PC

(57) ABSTRACT

An anti-virus system provider distributes an e-mail identifying content filtering rule seeking to identify e-mail messages suspected of containing an item of malware from a central source (20) to users (2). This distribution may be by an e-mail message itself which is appropriately signed and encrypted. At the user system (2), the received e-mail identifying content filtering rule is extracted from the e-mail message and added to the content filtering rules (18) being applied within that user system. In this way, malware which is distributed by e-mail may be identified by characteristics of its carrier e-mail rather than characteristics of the malware itself which not yet have been properly analyzed or the mechanisms for detecting such characteristics of the malware itself not yet put in place.

28 Claims, 6 Drawing Sheets

DETECTING MALWARE CARRIED BY AN E-MAIL MESSAGE

This is a Continuation application of prior application Ser. No. 10/142,167 filed on May 10, 2002, now, U.S. Pat. No. 7,237,008 the disclosure of which is incorporated herein by reference.

BACKGROUND OF THE INVENTION

1. Field of the Invention

This invention relates to the field of data processing systems. More particularly, this invention relates to the detection of malware, such as computer viruses, Trojans, worms and the like, carried by e-mail messages.

2. Description of the Prior Art

It is becoming increasingly common for items of malware to be propagated within or attached to an e-mail message. Such malware can spread rapidly and be highly destructive. Some forms of malware which are particularly rapidly spreading are self-propagating whereby when a computer is infected with the malware the malware operates to e-mail itself to one or more other computers which it may then also infect.

The destructive effects and large economic costs associated with malware outbreaks are such that measures which can reduce the spread of malware or the effect of malware outbreaks are highly advantageous.

It is a characteristic of malware outbreaks that when a new item of malware is released into the wild, the existing malware scanners are often unable to detect, or inefficient at detecting, the new item of malware. The virus definition data typically used to detect malware efficiently is necessarily one step behind the release of new items of malware since when these have been released, they must be identified to find suitable characteristics within them which can then be added to the virus definition data and searched for by a malware scanner to efficiently identify the new item of malware. The process of obtaining reports of a new item of malware, analysing the threat posed by the new item of malware, deciding to issue an emergency virus definition data update, generating the updated virus definition data and distributing the updated virus definition data to customers takes a finite amount of time. During this time, the new item of malware may be rapidly spreading and causing significant harm to computer systems. It might be thought that one way of shortening this time before the counter-measures were available would be to forego analysing the severity of the threat posed by a new item of malware and immediately press ahead with generating new virus definition data in all cases. However, this has the disadvantage of forcing computer system users to frequently update their virus definition data with the new virus definition data in circumstances where this may not be necessary or justified by the severity of the threat being posed. Furthermore, the increasing rate at which new items of malware are being released into the wild is such that responding to all of these by immediately developing new virus definition data would consume a disadvantageous amount of development time and expense.

SUMMARY OF THE INVENTION

Viewed from one aspect, the present invention provides a computer program product operable to control a computer to detect an item of malware carried by an e-mail message, said computer program product comprising:

rule receiving code operable to receive from a remote source an e-mail identifying content filtering rule defining one or more characteristics of an e-mail message indicative of said e-mail message carrying said item of malware;

message receiving code operable to receive a target e-mail message;

content filtering code operable to apply said e-mail identifying content filtering rule to said target e-mail message to detect if said target e-mail message has said one or more characteristics and, if said target e-mail message has said one or more characteristics, then triggering a suspected malware found action.

The invention recognises that as many of the most threatening items of new malware are propagated by e-mail messages, it is possible to detect an item of malware by detecting characteristics of its associated propagating e-mail message rather than detecting characteristics of the malware itself. Accordingly, an e-mail identifying content filtering rule may be generated and applied to identify suspect e-mail messages that may be propagating an items of malware. This approach has the significant advantages that a suitable e-mail identifying content filtering rule may be very rapidly developed, possibly based upon user reports prior to a sample of the e-mail message and malware being received. Furthermore, such content filtering rules are generally easier to distribute and apply than an update to virus definition data. Accordingly, the present technique allows a counter-measure e-mail identifying content filtering rule to be rapidly and efficiently deployed to users earlier in a malware outbreak giving the users some protection against the malware and suppressing the spread of the malware prior to the full virus definition data update becoming available if the malware outbreak is of a severity that justifies this.

Whilst the e-mail identifying content filtering rule could be distributed in a variety of different ways from the central source (e.g. the anti-virus system provider), a particularly preferred way of distributing this e-mail identifying content filtering rule is by an e-mail message itself.

Other possible distribution technique which are well suited to this purpose are multicasting (possibly using a subscription channel) and downloading from a secure remote server (e.g. downloading using HTTPS and a regular polling check for updates at the server).

In order to resist tampering with such e-mail messages being used to transmit e-mail identifying content filtering rules, preferred embodiments use signature and encryption techniques to authenticate the e-mail messages and mask their content.

A significant preferred feature of the invention is the generation of detection activity reports relating to the detection action of the e-mail identifying content filtering rule that are then sent back to a remote report collector. This report information can provide vital information regarding the spread and threat posed by a new item of malware to enable the anti-virus system provider to more appropriately respond to the new item of malware.

As an example of a preferred feature of the detection activity report, this may be set up to submit a sample of the item of malware concerned to the anti-virus system provider during the early phases of an outbreak as the anti-virus system provider may not yet have a proper sample and may merely be reacting to user reports with the issue of the e-mail identifying content filtering rule.

A further useful item of information that may be included within a detection activity report is whether or not a target e-mail which triggered the rule was inbound to or outbound from a particular computer network. If the target e-mail message was outbound from that network, then this would tend to indicate that the network concerned was already infected and accordingly might be subject to a different type of response, such as being given a high priority for the eventual distribution of updated virus definition data.

Whilst the suspected malware found actions could take a wide variety of forms, preferred embodiments of the invention serve to suspend delivery of the target e-mail messages concerned. The preliminary nature of the e-mail identifying content filtering rule in the outbreak strategy means that it may later be possible to clean and deliver those e-mail messages or use those e-mail messages to track the source of the infection or the like. This suspended messages may be released at a later time to be rescanned.

Whilst it will be appreciated by those in the field that the characteristics of an e-mail message which may indicate that it is propagating an item of malware could take a wide variety of different forms, generally speaking these will include one or more characteristics of the SMTP data forming the target message, such as characteristics of the SMPT structure, the sender field, relay field, subject field, body message, attachment file type and/or attachment file name.

The e-mail identifying content filtering rules distributed from the central source out to users, subscribers, customers, etc., could be provided in a form in which they may be automatically identified and acted upon by appropriate software running at the receiving end. This would provide a rapid way of clamping down upon malware outbreaks. However, some users may be uncomfortable with such automatic alteration of their content filtering rules and accordingly may only apply those e-mail identifying content filtering rules that have above a certain level of indicated priority or may require some or all rules to be confirmed by a user (administrator) before application within the receiving system.

Once an e-mail identifying content filtering rule is in place, it will usually be the case that the need for that rule, or the form of that rule, will or should change during the progress of a malware outbreak. As an example, when an outbreak first occurs, the rule may specify that when a suspected e-mail is found, then a sample of the malware is returned to the anti-virus provided. Once the anti-virus provider has received enough such samples, they may issue an updated rule by a rule-altering message which serves to supersede the initial content filtering rule and thereafter no longer require a sample to be returned. Other examples would be that the reporting sensitivity of the rule could be reduced should an outbreak escalate in order to avoid too many activity reporting messages needing to be generated and received. Another example of an activity-altering message would be one that rescinded a rule, such as, for example, once the virus definition data had become available, the temporary content filtering rule could be rescinded. In some circumstances, a content filtering rule could rescind itself (e.g. be auto-rescinding) by detecting that an appropriate level of virus definition data had been installed corresponding to the level which had the virus definition data for the newly-released item of malware.

Whilst it will be understood that one aspect of the present invention operates within the user system to receive and use the e-mail identifying content filtering rules against malware threats, a complementary aspect of the invention is provided at the anti-virus provider's system end in the generation of the e-mail identifying content filtering rule and the sending of this to the users, together with the receiving of detection activity reports.

Accordingly, in accordance with another aspect of the invention, there is provided a computer program product for control a computer to gather information regarding an item of malware carried by an e-mail message, said computer program product comprising:

sending code operable to send to a remote destination an e-mail identifying content filtering rule defining one or more characteristics of an e-mail message indicative of said e-mail message carrying said item of malware; and report receiving code operable to receive a detection activity report from said remote destination indicative of detection action of said e-mail identifying content filtering rule at said remote destination.

As well as being embodied in the form of a computer program product for controlling a general purpose computer in accordance with the above described techniques, the present invention may also be considered as a method of performing the above described techniques and/or an apparatus for providing the above described techniques.

The above, and other objects, features and advantages of this invention will be apparent from the following detailed description of illustrative embodiments which is to be read in connection with the accompanying drawings.

BRIEF DESCRIPTION OF THE DRAWINGS

Embodiments of the invention will now be described, by way of example only, with reference to the accompanying drawings in which.

DESCRIPTION OF THE PREFERRED EMBODIMENTS

Figure 1:
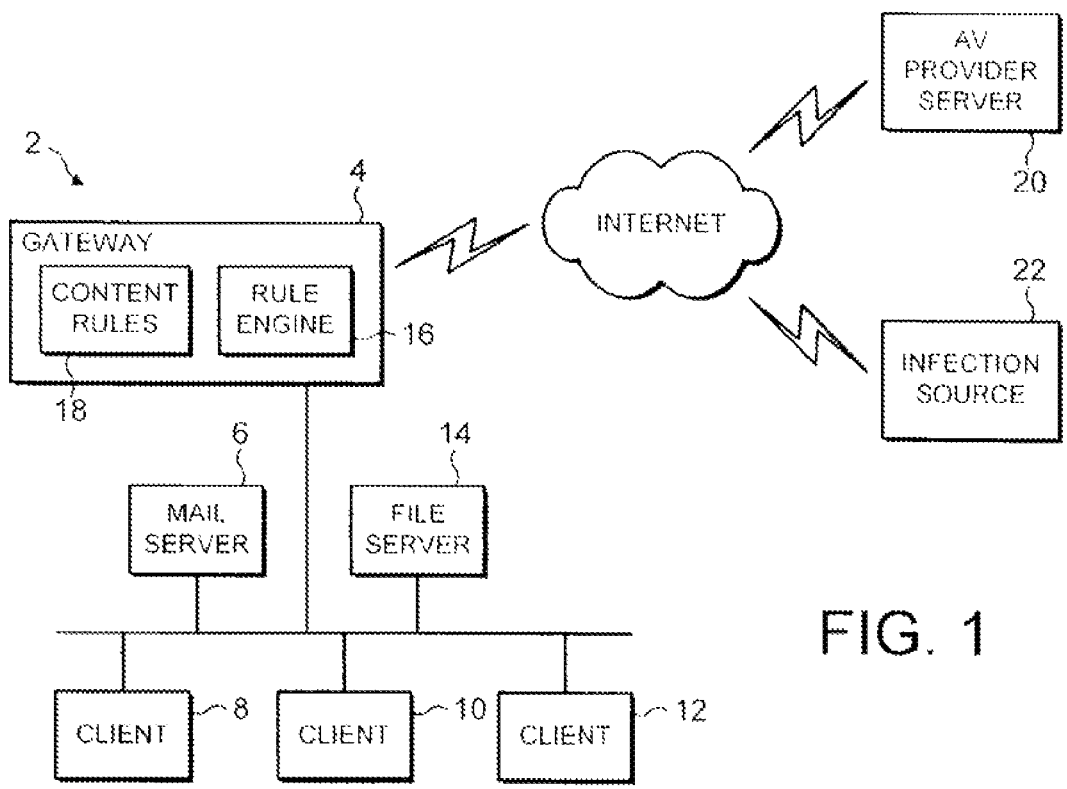
FIG. 1 is a diagram schematically illustrating a computer network connected via the internet to receive e-mail messages which may contain items of malware.

FIG. 1 illustrates a computer network 2 which it is desired to protect from malware received by e-mail messages. All e-mail messages received from the Internet into the network 2 pass through a gateway computer 4. If the message traffic makes its way through the gateway computer 4, then it will reach the mail server 6 before being passed to an appropriate one of the client computers 8, 10, 12. A file server 14 is also provided on the network 2 to take care of file storage requirements and the like.

In the example illustrated, the gateway computer 4 is shown as including a content filtering rule engine 16 which acts to examine e-mail messages passing through the gateway computer and determine whether or not those e-mail messages match one or more of a set of content rules 18 that have been predefined. It will be understood that such a rule engine and content rules are in themselves known technologies in that they are typically used to identify e-mail messages containing banned words or content, such as obscene words, confidential information, banned images and the like. The present technique makes use of this technology and the existing provision of such mechanisms within networks by seeking to use an e-mail identifying content filtering rule to identify e-mails having one or more characteristics indicative of that e-mail containing an item of malware. In this way, the existing content filtering mechanisms may be used to block the propagation of malware-carrying e-mail messages and suppress the infection that may result from such messages.

In the example shown, the gateway computer 4 is separately provided from the other computers within the network 2. However, it will be appreciated that amongst other alternatives are the provision of the content filtering functionality within the mail server software running on the mail server computer 6 or as a separate logical piece of software executing on the mail server computer 6 as well as other possibilities.

FIG. 1 also illustrates that the computer network 2 and the gateway computer 4 are linked via the internet to an anti-virus system provider's server 20 as well as the infection source 22 itself. In operation, the virus definition data used by a malware scanner (not illustrated) within the computer network 2 will be sent from the anti-virus system provider's server 20 to the computer network 2. Pending the generation and delivery of such updated virus definition data, an e-mail message, which may be signed and encrypted and require signature authentication and decryption prior to use, is sent from the anti-virus system provider's server 20 to the network 2 to pass an e-mail identifying content filtering rule that is used within the gateway computer 4 to identify e-mail messages passing through the gateway computer 4 as being suspected of containing an item of malware. As an alternative the anti-virus system provider's server 20 may operate to multicast the e-mail identifying content filtering rule(s) (possibly by a secure, subscription channel) or may serve as a source for downloading of the e-mail identifying context filtering rule(s) (possibly via HTTPS following a regular poll for updates). The rule engine 16 serves to scan e-mail messages passing through it and can be adapted to identify predetermined patterns or data within an e-mail message it is analysing to identify an e-mail message as one which contains a duly authorised (e.g. after appropriate decryption and signature authentication) new e-mail identifying content filtering rule that has been sent to the network 2 from the anti-virus system provider's server computer 20. When such an e-mail message is identified, the new e-mail identifying content filtering rule can be extracted from the e-mail message and added to the set of content rules 18 being used by the gateway computer 4 and the rule engine 16. The new rule may also specify activity such as detection activity report generation for detection activity reports which are generated within the gateway computer 4 and returned to the anti-virus system provider's server computer 20 to indicate parameters such as the number triggers of that rule that have taken place over predetermined time periods (e.g. after one hour, after two hours, after four hours, after eight hours, etc.), reports when predetermined numbers of triggers have occurred (e.g. one trigger, two triggers, four triggers, eight triggers, etc.), return a sample of the malware item within the triggering e-mail message and the like.

The characteristics of an e-mail message which may be identified by the e-mail identifying content filtering rule as indicative of the presence of an item of malware can take a wide variety of different forms. Generally speaking, these will be characteristics of the SMTP data of the e-mail message concerned. When an item of malware generates its own e-mail messages, it will typically have a message header with a form having certain relatively constant and non-standard features that may be used to characterise such e-mail messages and identify them, e.g. formatting errors within the header, the absence of normal heading messages generally provided by genuine e-mail programs, and the like (SMTP Structure). At a more specific level, the rule being used could identify one or combinations of the following characteristics: a sender field, a relay field, a subject field, a body message, an attachment file type or an attachment file name associated with a particular e-mail message. A specific example of an e-mail identifying content filtering rule that might have been used to identify an item of malware prior to the virus definition date update being available would be one which identified the subject line as including "I Love You", the body text as including "Don't dare miss Valentines Day", and the e-mail as having a ".vbs" file type attachment. It will be appreciated that this content filtering rule is seeking to examine characteristics of the e-mail propagating the virus rather than identifying the offending virus code within the Visual Basic Script file.

Figure 2:
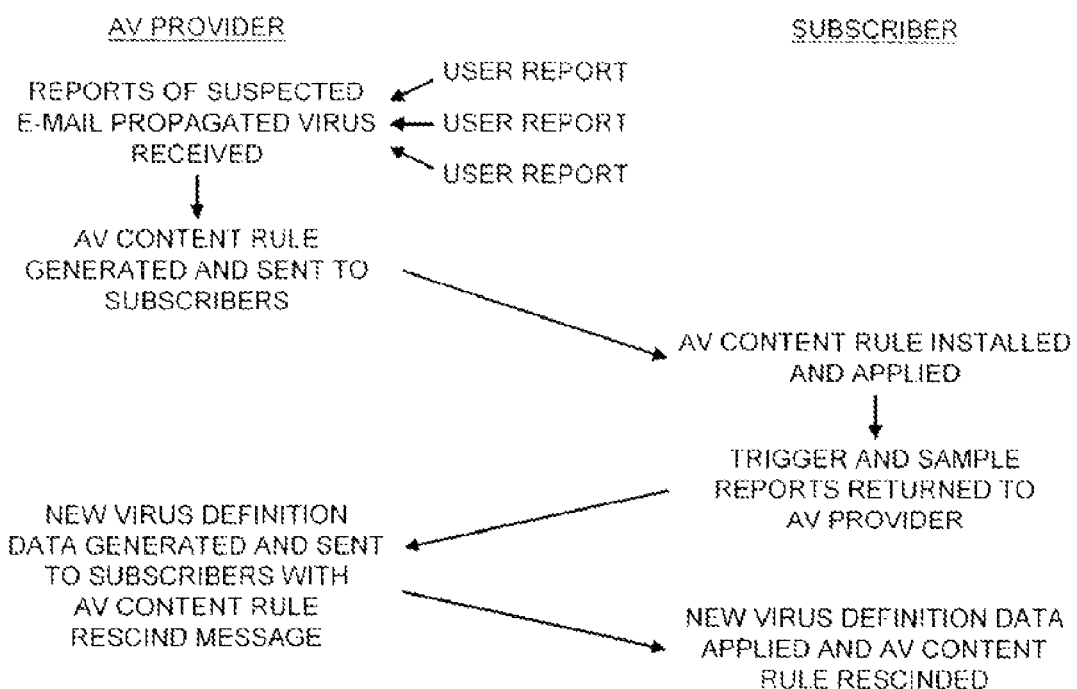
FIG. 2 schematically illustrates one example of the actions performed by an anti-virus provider and a system subscriber in accordance with the present techniques.

FIG. 2 schematically illustrates the flow of activity occurring both by the anti-virus system provider and the subscriber during the action of the above-described techniques. It will be appreciated that this is merely one example of how such activity may progress and different alternative scenarios are also possible.

Initially, a number of user reports are provided to the anti-virus system provider of suspected malware activity. These user reports could be telephone calls from customers, messages posted on bulletin boards, and the like. When these reports have received a sufficient level to be regarded as supra-threshold by the anti-virus system provider, then the anti-virus system provider generates an e-mail identifying content filtering rule targeted at the malware item suspected as existing from the user reports. It will be appreciated that the user reports may need to contain sufficiently consistent information that would enable a reliable and reasonably specific identification of the e-mail messages posing a threat to be made. Once this rule had been generated, it is embedded within an e-mail message, in an encrypted form, the e-mail message concerned is signed by the anti-virus system provider and then sent to users of the system, which may be a subscription system given the higher level and premium nature of the protection provided.

At the subscriber's side, the received e-mail message will be authenticated and decrypted and then the embedded new content rule installed and applied using the content filtering mechanisms within the subscriber system. The subscriber system will then generate detection activity reports which are returned to the anti-virus system provider, possibly in the form of returned signed and encrypted e-mails. The detection activity reports could, for example, include reports issued at predetermined set times, when predetermined trigger threshold levels of detection have occurred, an outbound suspect e-mail message is detected (outbound messages would generally be regarded as significant in that they would indicate that the computer network behind the content filtering mechanism had become infected and was starting to generate propagating e-mail messages routed to others outside of the network concerned and the like.

Meanwhile, and possibly dependent upon the nature of the detection activity reports received, the anti-virus system provider may be working upon an updated set of virus definition data targeted at the new item of malware, possibly isolated by way of a sample returned with a detection activity report. When such an updated set of virus definition data (or suitable data patch) is available, it is distributed to subscribers/users using the normal distributions mechanisms and a rule rescinding message sent to the content filtering system of the subscribers/users to switch off the e-mail identifying content filtering rule when the virus definition data update is in place on the system concerned.

It will be appreciated that in the example of FIG. 2, only a single rule is shown as being sent from the anti-virus system provider to the subscribers/users. In practice, as an outbreak progresses, the rule provided by the anti-virus system provider may be refined and distributed from the anti-virus system provider acting as a central source out to the subscribers/ users.

Figure 3:
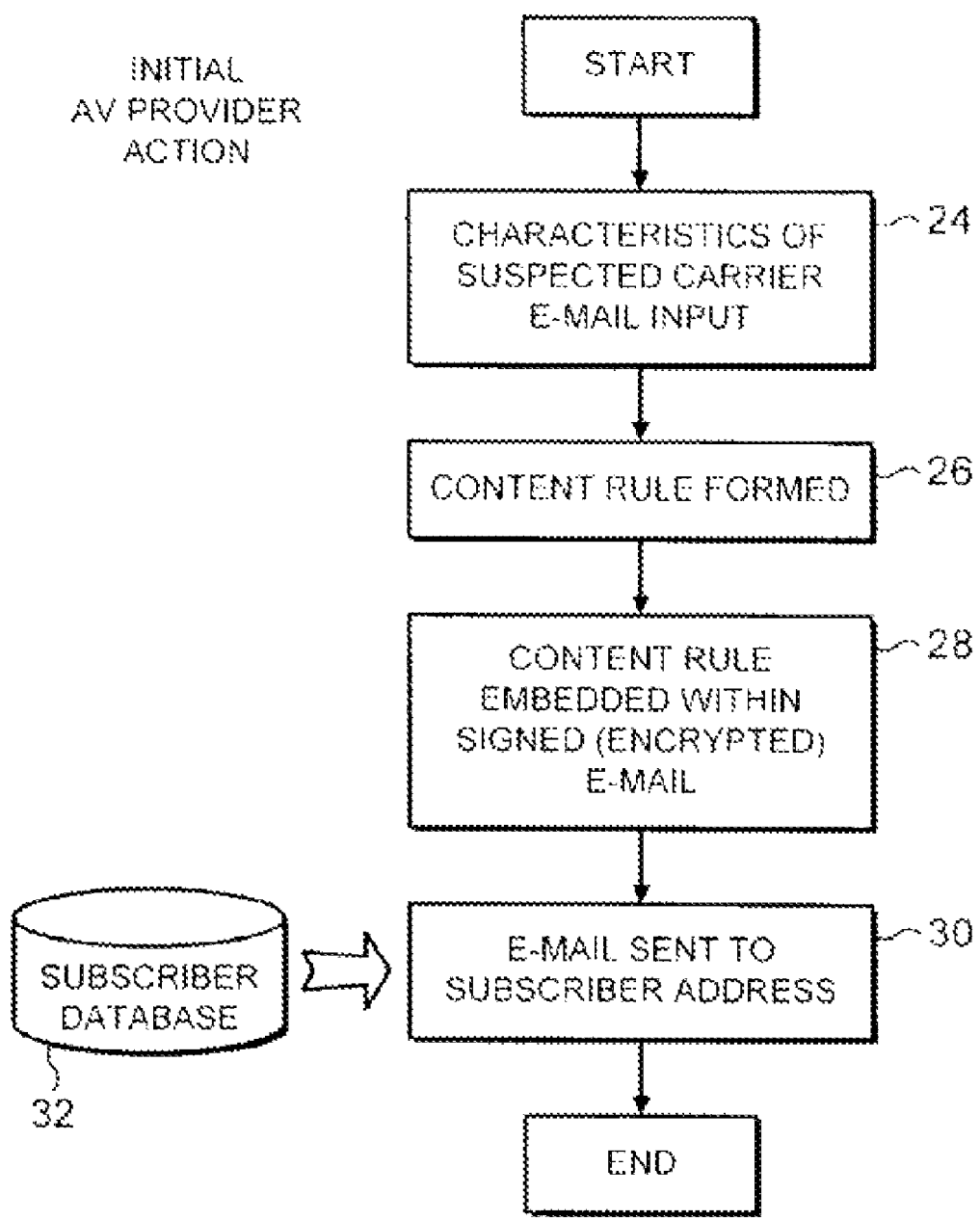
FIG. 3 is a flow diagram schematically illustrating the processing performed by an anti-virus provider in issuing a new e-mail identifying content filtering rule.

FIG. 3 is a flow diagram illustrating the processing activity initially performed by an anti-virus system provider. At step 24, the characteristics of a suspected carrier e-mail which is propagating the new item of malware are input. These e-mail characteristics can take a wide variety of different forms, such as those discussed above including the sender field content, the subject field content, the content of the body message text, an attachment file name or file type, and the like. At step 26, a content filtering rule to identify the suspected e-mail messages is formed. At step 28, this content filtering rule is embedded within a signed and encrypted e-mail message which is to be sent to subscribers/users. At step 30, a subscriber database 32 of subscriber e-mail addresses is accessed and the e-mail containing the embedded content filtering rule formed at step 28 is sent out to all the subscriber addresses.

Figure 4:
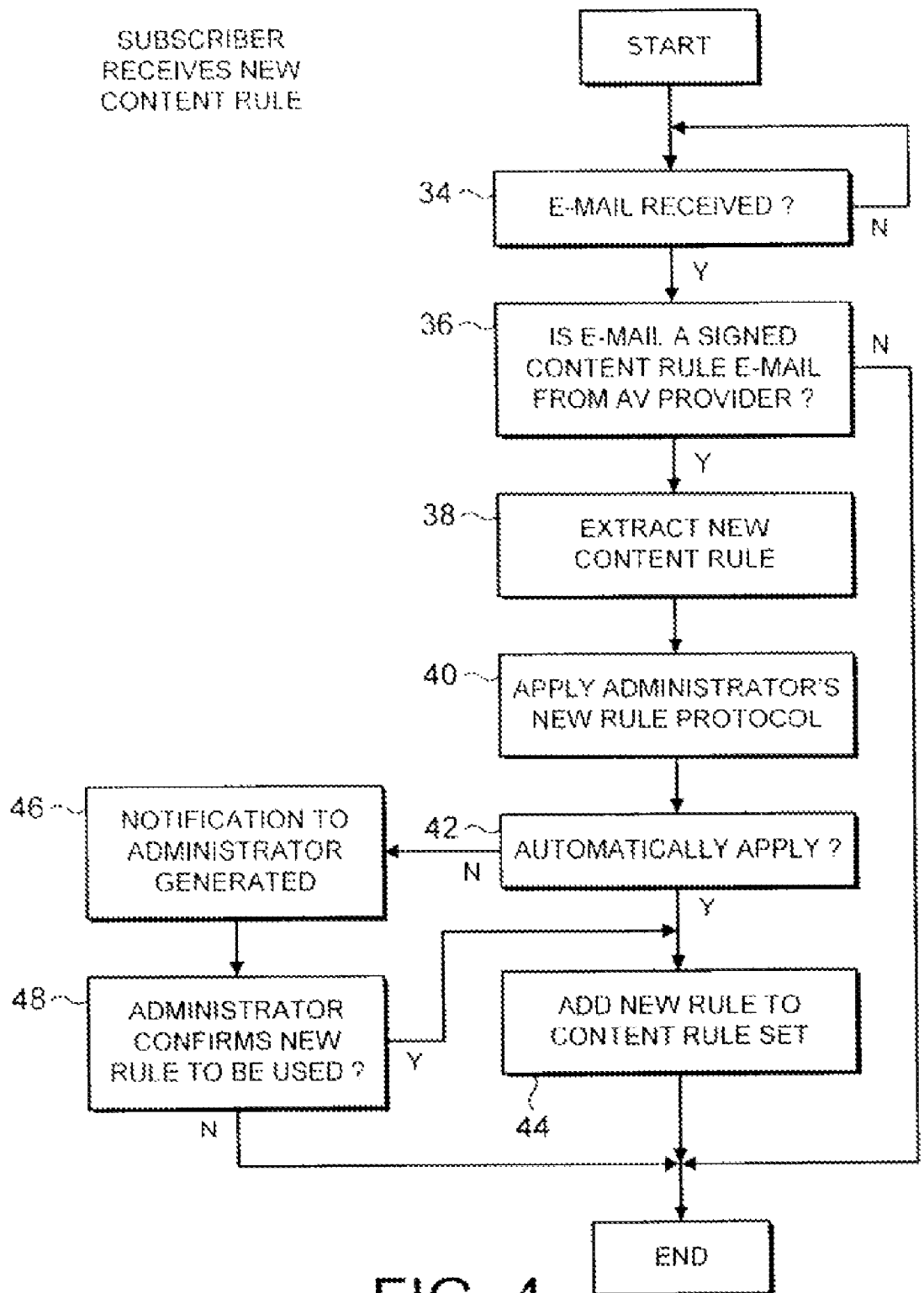
FIG. 4 is a flow diagram schematically illustrating the processing performed by a subscriber system when receiving a new e-mail identifying content filtering rule.

FIG. 4 is a flow diagram schematically illustrating the processing performed when a subscriber system receives a new content filtering rule. At step 34, the system waits until an e-mail message is received. At step 36, a received e-mail message is checked to see if it is signed by the anti-virus system provider. Such a signature is taken as an indication that the e-mail message concerned contains an embedded new content filtering rule to be implemented at the subscriber system (or an activity altering message) as well as serving to authenticate the e-mail message. If the e-mail message is not signed by the anti-virus system provider, then this thread terminates. It will be understood that in practice this thread will be continuously run and will be restarted immediately.

If an appropriately signed e-mail message is identified in step 36, then step 38 serves to extract the new content filtering rule from the e-mail message. At step 40, the administrator's user-defined protocol for how such new rules should be applied is read and acted upon. There are a wide variety of possibilities for such a protocol. The content filtering rules may have associated priority levels which indicate the anti-virus system provider's view as to the severity of the threat posed by the new item of malware. An administrator may configure their system to automatically apply those new content filtering rules which are characterised as being of a high threat by the anti-virus system provider whilst lower threat rules are not automatically applied and are referred for confirmation by the administrator. Other possibilities might be to vary the automatic or referred nature of the rule application dependent upon the day of the week or the time, such as having rules automatically applied when received out-of-hours since an administrator would not be available to confirm their use within an appropriate amount of time.

At step 42, a determination is made as to whether or not the rule should automatically be applied. If the rule is to be automatically applied, then step 44 adds the new rule to the set of content filtering rules being applied by the content filtering mechanism within the subscriber system. Step 14 also serves to activate the detection activity reporting mechanisms in accordance with what is specified within the received e-mail message and associated new content filtering rule.

If the new rule is not to be automatically applied, then step 46 serves to generate an notification to an administration of the receipt of a new rule, such as generating a paging message to the administrator, and then step 48 serves to determine whether or not the administrator confirms the new rule is to be used prior to either applying the new rule at step 44 or terminating without applying the new rule.

Figure 5:
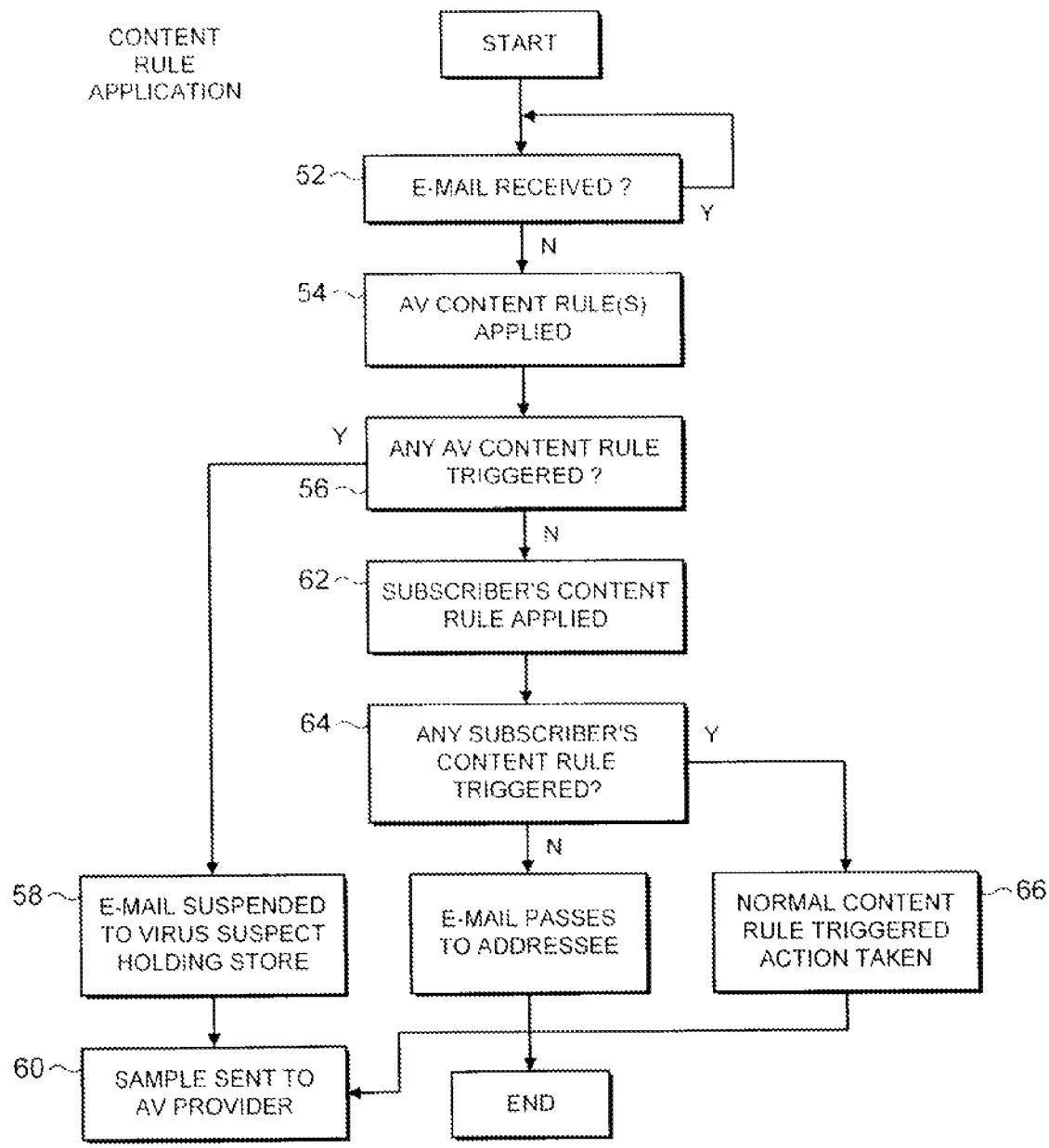
FIG. 5 is a flow diagram schematically illustrating the use at a subscriber system of an e-mail identifying content filtering rule.

FIG. 5 is a flow diagram schematically illustrating the processing performed at a subscriber system in applying the content filtering rule. At step 50, the system waits to receive an e-mail message.

Once an e-mail message is received, step 54 applies the content filtering rule which is seeking to identify the item of malware. At step 56, a determination is made as to whether any of the anti-virus content filtering rules (more than one may be present at any given time) has been triggered. If such an anti-virus content filtering rule has been triggered, then processing proceeds to step 58 at which the e-mail message concerned is suspended from further delivery and placed in a holding store. Such suspended e-mail messages may subsequently be released from the holding store and delivered on to the appropriate recipient when it has been determined that the malware threat is not in fact real or appropriate cleaning mechanisms have been applied to the e-mail messages concerned. The suspended e-mail may be rescanned with one or more content filtering rules when they are released.

If the content filtering rule so specifies, then step 60 may serve to send an e-mail containing a sample of the triggering e-mail message back to the anti-virus system provider such that the malware item within that triggering e-mail message can be studied by the anti-virus system provider as part of the generation of counter measures.

If no anti-virus content filtering rules are triggered at step 56, then processing proceeds to step 62 at which the subscriber's normal content filtering rules, such as rules looking for banned words, images and the like, are applied. If any of these rules is triggered as detected at step 64, then processing proceeds to step 66 at which the normal content rule triggered action is taken, such as generation of an administrator alert, a user notification generation, suppressing the e-mail concerned, etc. If none of either the anti-virus content filtering rules or the subscriber's normal content filtering rules are triggered, then processing proceeds to step 68 after step 64 and the e-mail is normally passed to its addressee. It will be appreciated that the vast majority of e-mail messages which are non-infected and do not contain any inappropriate material normally trapped by the content rules will pass to step 68 and be processed in the normal way.

Figure 6:
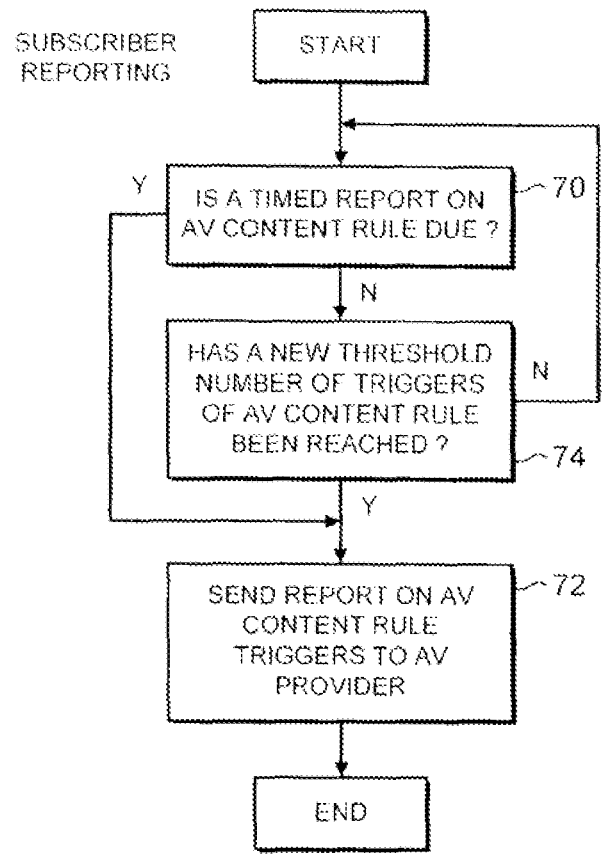
FIG. 6 is a flow diagram schematically illustrating the generation of detection activity reports within a subscriber system.

FIG. 6 is a flow diagram schematically illustrating the generation of detection activity reports within the subscriber system. At step 70, the subscriber system determines whether a time has been reached at which a timed detection activity report should be issued. If such a time has been reached, then processing proceeds to step 72 at which a detection activity report is returned in the form of an e-mail message to the anti-virus system provider. If a timed message is not indicated as being required, then processing proceeds to step 74 at which a determination is made as to whether or not a new threshold number of triggers of the anti-virus content filtering rule has been reached, such as trigger levels predetermined at one detection, two detections, four detections, eight detections, sixteen detections, thirty two detections, etc. If such a threshold number trigger level has been exceeded, then a detection activity report is again generated at step 72. If no reports need to be generated, then processing returns to step 70.

Figure 7:
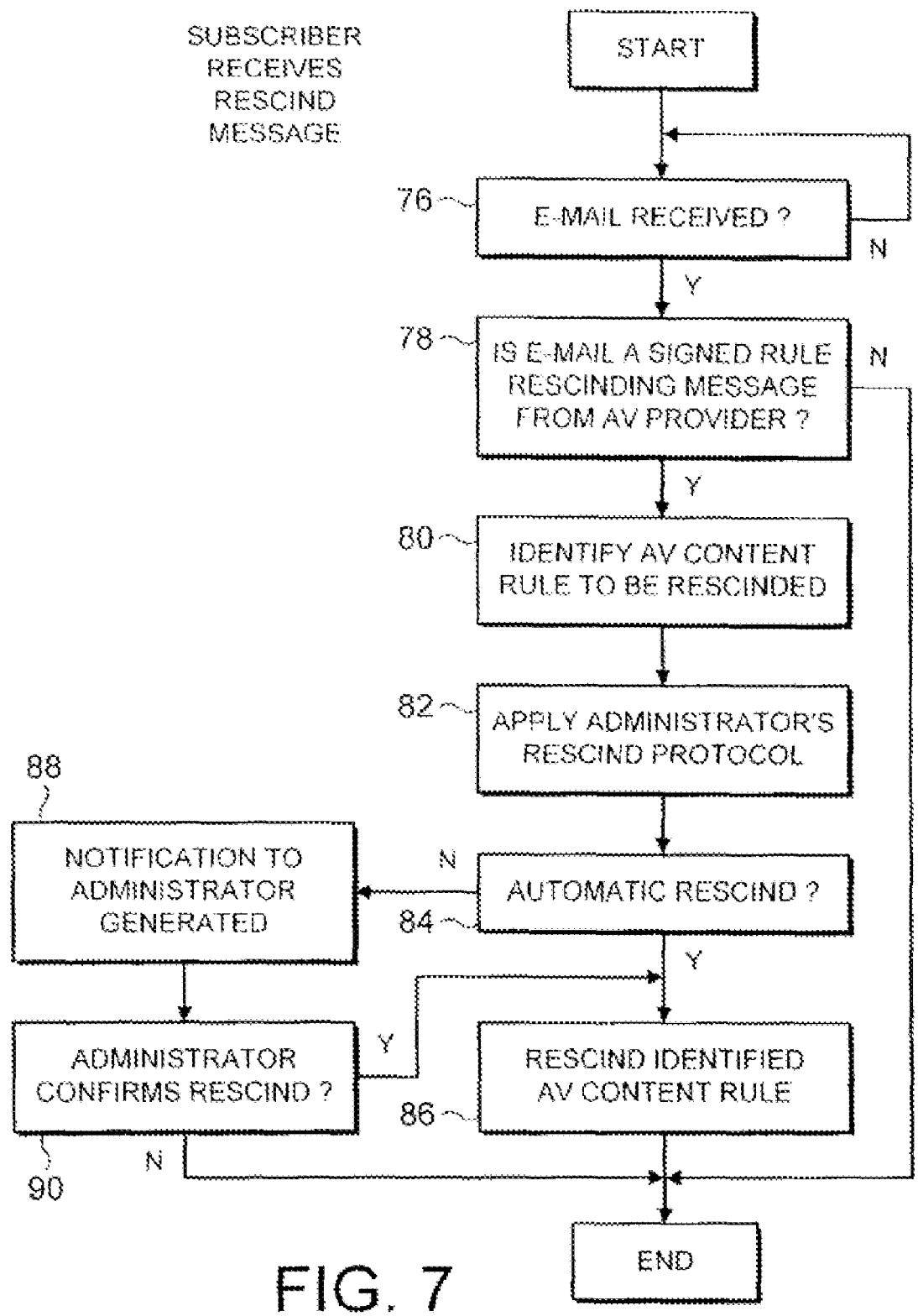
FIG. 7 is a flow diagram schematically illustrating the receipt of an activity-altering e-mail message within a subscriber system.

FIG. 7 is a flow diagram schematically illustrating the processing performed when a subscriber system receives an activity-altering message. In this example, the activity-altering message is a message which is serving to rescind an anti-virus content filtering rule and change it from being active to non-active. In practice, other activity-altering messages may serve to supersede a currently-active rule, modify a currently-active rule, or perform a variety of other control functions.

At step 76, the subscriber system waits until an e-mail message is received. At step 78, a received e-mail message is identified as being appropriately signed by the anti-virus system provider and containing a rescind message. If the received e-mail message does not have this form, then this thread terminates, or in practice restarts.

Subsequent to step 78 upon receipt of an appropriately signed rule-rescinding message, step 80 identifies the anti-virus content filtering rule which is to be rescinded by examining the message concerned and then applies the administrator's protocol for dealing with such rescind message.

In an analogous way to that described above for the application of newly received anti-virus content filtering rules, an administrator may want to predefine how they respond to rescind messages. It may be that an administrator is cautious and wishes to confirm themselves the rescinding of an anti-virus content filtering rule rather than allow this to automatically take place. Alternatively, some users may be happy to automatically respond to rescind messages.

Step 84 determines whether the protocol indicates that an automatic rescind should take place. If an automatic rescind should take place, then processing proceeds to step 86 at which the identified anti-virus content filtering rule is rescinded.

If automatic rescinding is not appropriate, then processing proceeds after step 84 to step 88, at which a notification to the administrator of receipt of the rescind message is issued. If the administrator confirms the rescind message at step 90, then processing proceeds to step 86 to rescind the message. Alternatively, if the administrator indicates that the rescind message should not be acted upon, then thread terminates, or restarts.

A content filtering rule may also be auto-rescinding upon, detection of a predetermined conditions, e.g. over a certain age, upon detection of a virus definition data update, etc.

Figure 8:
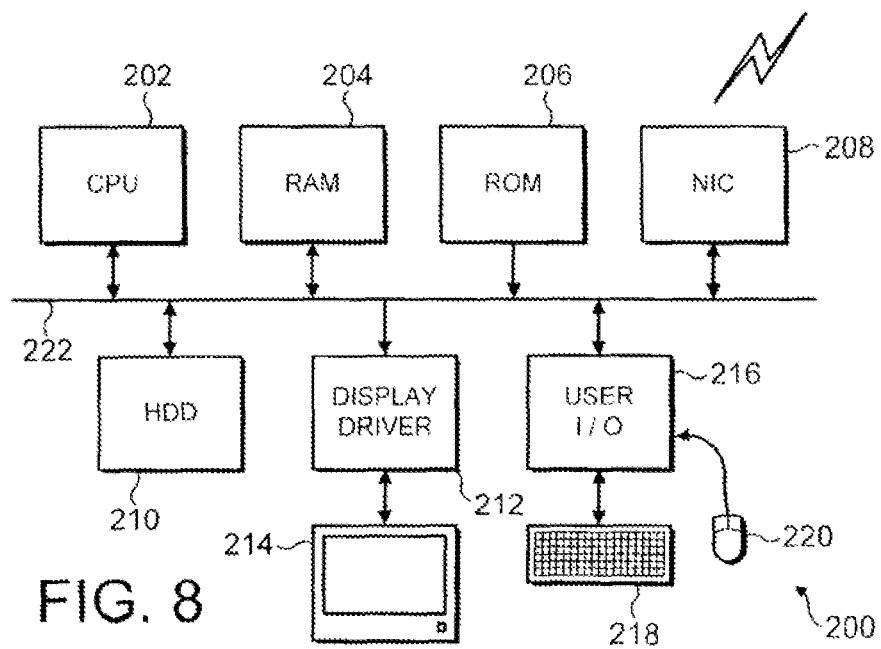
FIG. 8 is a diagram schematically illustrating the architecture of a general purpose computer of the type that may be used to implement the above described techniques.

FIG. 8 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 8 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method of detecting an item of malware carried by an e-mail message, said method comprising the steps of:

receiving from a remote source an e-mail identifying content filtering rule defining one or more characteristics of an e-mail message indicative of said e-mail message carrying said item of malware;

receiving a target e-mail message;

applying said e-mail identifying content filtering rule to said target e-mail message to detect if said target e-mail message has said one or more characteristics; and if said target e-mail message has said one or more characteristics, then triggering a suspected malware found action;

wherein detection action of said e-mail identifying content filtering rule is reported with a detection activity report to a remote report collector;

wherein said detection activity report includes an indication of whether a target e-mail message which has said one or more characteristics was inbound to a predetermined computer network or outbound from said predetermined computer network;

wherein said suspected malware found action includes suspending delivery of said target e-mail message;

wherein said one or more characteristics include one or more of:

a sender field matching predetermined characteristics;
a relay field matching predetermined characteristics;
a subject field matching predetermined characteristics;
a body message matching predetermined characteristics;
an attachment having a file type matching predetermined characteristics;
an attachment having a filename matching predetermined characteristics; and
Simple Mail Transfer Protocol (SMTP) structure matching predetermined characteristics;

wherein said e-mail identifying content filtering rule is auto-rescinding in response to detection of predetermined conditions.

2. A method as claimed in claim 1, wherein said e-mail identifying content filtering rule is received from said remote source within a rule transmitting e-mail message.

3. A method as claimed in claim 1, wherein said e-mail identifying content filtering rule is received from said remote source by one of a multicast from said remote source and a download from said remote source.

4. A method as claimed in claim 2, wherein said rule transmitting e-mail message includes an electronic signature for authentication and said electronic signature is verified before said e-mail identifying content filtering rule is used.

5. A method as claimed in claim 2, wherein said rule transmitting e-mail message is encrypted and said rule transmitting e-mail message is decrypted before said e-mail identifying content filtering rule is used.

6. A method as claimed in claim 1, wherein said detection activity report includes a sample of said item of malware.

7. A method as claimed in claim 1, wherein a target e-mail message for which delivery has been suspended may be released for delivery at a later time.

8. A method as claimed in claim 1, wherein said one or more characteristics include one or more characteristics of SMTP data forming said target e-mail message.

9. A method as claimed in claim 1, wherein a received e-mail identifying content filtering rule is one of automatically made active or made active once confirmed for use by a user input.

10. A method as claimed in claim 9, wherein a priority level associated with said received e-mail identifying content filtering rule and predetermined user specified parameters determine if said received e-mail identifying content filtering rule is automatically made active or made active once confirmed for use by a user input.

11. A method as claimed in claim 1, further comprising the steps of:
receiving from a remote source a rule altering message; and
in response to receipt of said rule altering message altering said e-mail identifying content filtering rule.

12. A method as claimed in claim 11, wherein a received rule altering message is one of automatically responded to or responded to once confirmed by a user input.

13. A method as claimed in claim 11, wherein said rule altering message is one of a rule rescinding message which serves to rescind said e-mail identifying content filtering rule and a rule superseding message which serves to supersede said e-mail identifying content filtering rule.

14. A method as claimed in claim 1, wherein if the indication indicates that the target e-mail message was outbound from said predetermined computer network, said predetermined computer network is considered already infected, and is given a high priority for the eventual distribution of an updated virus definition data.

15. A method as claimed in claim 1, wherein the received e-mail identifying content filtering rule specifies detection activity report generation for detection activity reports to indicate a number of triggers of the rule that have taken place over at least one predetermined time period.

16. A method of detecting an item of malware carried by an e-mail message, said method comprising the steps of:
receiving from a remote source an e-mail identifying content filtering rule
defining one or more characteristics of an e-mail message indicative of said e-mail message carrying said item of malware;
receiving a target e-mail message;
applying said e-mail identifying content filtering rule to said target e-mail message to detect if said target e-mail message has said one or more characteristics; and
if said target e-mail message has said one or more characteristics, then triggering a suspected malware found action;
wherein detection action of said e-mail identifying content filtering rule is reported with a detection activity report to a remote report collector;
wherein said detection activity report includes an indication of whether a target e-mail message which has said one or more characteristics was inbound to a predetermined computer network or outbound from said predetermined computer network;
wherein said suspected malware found action includes suspending delivery of said target e-mail message;
wherein a target e-mail message for which delivery has been suspended may be released to be rescanned by one or more content filtering rules at a later time;
wherein said one or more characteristics include one or more of:
a sender field matching predetermined characteristics;
a relay field matching predetermined characteristics;
a subject field matching predetermined characteristics;
a body message matching predetermined characteristics;
an attachment having a file type matching predetermined characteristics;
an attachment having a filename matching predetermined characteristics; and
SMTP structure matching predetermined characteristics.

17. A method as claimed in claim 16, wherein said e-mail identifying content filtering rule is received from said remote source within a rule transmitting e-mail message.

18. A method as claimed in claim 16, wherein said e-mail identifying content filtering rule is received from said remote source by one of a multicast from said remote source and a download from said remote source.

19. A method as claimed in claim 17, wherein said rule transmitting e-mail message includes an electronic signature for authentication and said electronic signature is verified before said e-mail identifying content filtering rule is used.

20. A method as claimed in claim 17, wherein said rule transmitting e-mail message is encrypted and said rule transmitting e-mail message is decrypted before said e-mail identifying content filtering rule is used.

21. A method as claimed in claim 16, wherein said detection activity report includes a sample of said item of malware.

22. A method as claimed in claim 16, wherein a target e-mail message for which delivery has been suspended may be released for delivery at a later time.

23. A method as claimed in claim 16, wherein said one or more characteristics include one or more characteristics of SMTP data forming said target e-mail message.

24. A method as claimed in claim 16, wherein a received e-mail identifying content filtering rule is one of automatically made active or made active once confirmed for use by a user input.

25. A method as claimed in claim 24, wherein a priority level associated with said received e-mail identifying content filtering rule and predetermined user specified parameters determine if said received e-mail identifying content filtering rule is automatically made active or made active once confirmed for use by a user input.

26. A method as claimed in claim 16, further comprising the steps of:
receiving from a remote source a rule altering message; and
in response to receipt of said rule altering message altering said e-mail identifying content filtering rule.

27. A method as claimed in claim 26, wherein a received rule altering message is one of automatically responded to or responded to once confirmed by a user input.

28. A method as claimed in claim 26, wherein said rule altering message is one of a rule rescinding message which serves to rescind said e-mail identifying content filtering rule and a rule superseding message which serves to supersede said e-mail identifying content filtering rule.

* * * * *